United States Patent
Sadek et al.

(10) Patent No.: US 10,278,177 B2
(45) Date of Patent: Apr. 30, 2019

(54) OPPORTUNISTIC CARRIER AGGREGATION FRAMEWORK FOR EFFICIENT LTE OPERATION IN UNLICENSED SPECTRUM

(71) Applicant: QUALCOMM Incorporated, San Diego, CA (US)

(72) Inventors: Ahmed Kamel Sadek, San Diego, CA (US); Tamer Adel Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 193 days.

(21) Appl. No.: 14/255,926

(22) Filed: Apr. 17, 2014

(65) Prior Publication Data
US 2015/0065152 A1    Mar. 5, 2015

Related U.S. Application Data

(60) Provisional application No. 61/873,649, filed on Sep. 4, 2013.

(51) Int. Cl.
*H04L 5/00* (2006.01)
*H04W 72/04* (2009.01)

(52) U.S. Cl.
CPC ....... *H04W 72/0453* (2013.01); *H04L 5/0089* (2013.01); *H04L 5/0098* (2013.01); *H04L 5/001* (2013.01); *H04L 5/0044* (2013.01)

(58) Field of Classification Search
CPC .......... H04W 72/0453; H04L 72/0453; H04L 5/0089; H04L 5/0098; H04L 5/001; H04L 5/0044

(Continued)

(56) References Cited

U.S. PATENT DOCUMENTS

2004/0157613 A1* 8/2004 Steer ............... H04W 16/10
                                                       455/446
2012/0282942 A1* 11/2012 Uusitalo ........... H04W 16/14
                                                       455/452.2

(Continued)

FOREIGN PATENT DOCUMENTS

JP      2011528212 A     11/2011
JP      2012070134 A      4/2012

(Continued)

OTHER PUBLICATIONS

International Search Report and Written Opinion—PCT/US2014/053928—ISA/EPO—dated Nov. 18, 2014.

(Continued)

*Primary Examiner* — Marcus Hammonds
(74) *Attorney, Agent, or Firm* — Arent Fox, LLP

(57) ABSTRACT

Described herein are techniques for reducing efficient LTE operation in the unlicensed band. For example, the technique may involve establishing a connection with a primary component carrier on the licensed communication band or the unlicensed communication band. The technique may also involve determining at least one metric associated with a constraint on a transmissions channel of the unlicensed communication band. The technique may also involve sending the at least one metric to the primary component carrier. The technique may also involve receiving a message for one of switching on or switching off a secondary component carrier (SCC) for transmissions on the unlicensed communication band in response to sending the at least one metric.

37 Claims, 9 Drawing Sheets

(58) Field of Classification Search
USPC .................................. 455/450; 370/229–240
See application file for complete search history.

(56) References Cited

U.S. PATENT DOCUMENTS

| | | | | |
|---|---|---|---|---|
| 2013/0083661 | A1* | 4/2013 | Gupta | H04W 4/005 |
| | | | | 370/235 |
| 2013/0083783 | A1 | 4/2013 | Gupta et al. | |
| 2013/0088983 | A1 | 4/2013 | Pragada et al. | |
| 2013/0165134 | A1 | 6/2013 | Touag et al. | |
| 2013/0195073 | A1 | 8/2013 | Chen et al. | |
| 2013/0294356 | A1* | 11/2013 | Bala | H04W 16/14 |
| | | | | 370/329 |
| 2013/0322389 | A1* | 12/2013 | Maeda | H04L 5/001 |
| | | | | 370/329 |
| 2014/0010086 | A1* | 1/2014 | Etemad | H04B 7/0632 |
| | | | | 370/235 |
| 2014/0043979 | A1* | 2/2014 | Etemad | H04W 4/70 |
| | | | | 370/237 |
| 2014/0269300 | A1* | 9/2014 | Bennis | H04W 28/08 |
| | | | | 370/235 |
| 2014/0307638 | A1* | 10/2014 | Zacharias | H04L 5/0053 |
| | | | | 370/329 |
| 2014/0378157 | A1* | 12/2014 | Wei | H04W 16/14 |
| | | | | 455/454 |

FOREIGN PATENT DOCUMENTS

| | | |
|---|---|---|
| WO | 2012108399 A1 | 8/2012 |
| WO | 2012116489 A1 | 9/2012 |
| WO | 2012121757 A1 | 9/2012 |
| WO | 2012134567 A1 | 10/2012 |
| WO | 2012135998 A1 | 10/2012 |
| WO | 2013006988 A1 | 1/2013 |
| WO | 2013029251 A1 | 3/2013 |
| WO | 2013071506 A1 | 5/2013 |

OTHER PUBLICATIONS

Taiwan Search Report—TW103130147—TIPO—dated Jun. 7, 2018.
Wang Y., "Analysis of RRM Function & Architecture in LTE", Modern Electronics Technique, vol. 34, No. 13, Jul. 1, 2011, pp. 59-61.

* cited by examiner

OPPORTUNISTIC CARRIER AGGREGATION FRAMEWORK FOR EFFICIENT LTE OPERATION IN UNLICENSED SPECTRUM

CROSS-REFERENCE TO RELATED APPLICATIONS

The present application for patent claims priority to Provisional Application No. 61/873,649, filed Sep. 4, 2013, entitled "OPPORTUNISTIC CARRIER AGGREGATION FRAMEWORK FOR EFFICIENT LTE OPERATION IN UNLICENSED SPECTRUM", which is assigned to the assignee hereof, and is hereby expressly incorporated in its entirety by reference herein.

BACKGROUND

Aspects of the present disclosure relate generally to wireless communication systems, and more particularly to Long Term Evolution (LTE) operations in the unlicensed channels.

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. As used herein, a "carrier" refers to a radio band centered on a defined frequency and used for wireless communications.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A wireless communication network may support operation on multiple carriers. A carrier may refer to a range of frequencies used for communication and may be associated with certain characteristics. For example, a carrier may be associated with system information describing operation on the carrier. A carrier may also be referred to as a component carrier (CC), a frequency channel, a cell, etc.

An LTE UE device normally operates on the licensed frequency spectrum. The unlicensed frequency spectrum, however, may provide an inexpensive resource for wireless communications because no license is required to operate on the unlicensed frequency spectrum. In this context, there remains a need for mechanisms for exploiting carrier aggregation in the unlicensed bands.

SUMMARY

Illustrative aspects of the present disclosure that are shown in the drawings are summarized below. These and other aspects are more fully described in the detailed description section. It is to be understood, however, that the disclosure is not limited to the forms described in this Summary or in the detailed description.

In accordance with one or more aspects described herein, there is provided a method for LTE operation in the unlicensed spectrum. For example, the LTE operations may be optimized for the unlicensed spectrum. The method may involve establishing a connection with a primary component carrier on the licensed communication band or the unlicensed communication band. The method may involve determining at least one metric associated with a constraint on a transmissions channel of the unlicensed communication band. The method may involve sending the at least one metric to the primary component carrier. The method may involve receiving a message for one of switching on or switching off a secondary component carrier (SCC) for transmissions on the unlicensed communication band in response to sending the at least one metric.

In related aspects, the method may involve determining at least one metric associated with a threshold indicative of a traffic load on the unlicensed communication band, where the at least one metric includes one of a cell loading, traffic type, quality of service (QoS) indication, number of users on the unlicensed communication band, available backhaul bandwidth, or interference from access points.

In yet further related aspects, the method may involve receiving a message indicating to switch on of the SCC for transmissions on the unlicensed communication band when the at least one metric indicates a relatively high traffic load, or the message indicating switching off of the SCC for transmissions on the unlicensed communication band when the at least one metric does not indicate a relatively high traffic load.

In yet further related aspects, the method may involve determining whether the licensed communication band is available, and establishing the connection on the licensed communication band if the licensed communication band is available.

In yet further related aspects, the method may involve selecting a known frequency band if the licensed communication band is not available. The method may involve selecting one frequency band from a set of available frequency bands if the licensed communication band is not available.

In accordance with another one or more aspects described herein, there is provided a method for LTE operation in the unlicensed spectrum. The method may involve establishing a connection with a mobile entity on the licensed communication band or the unlicensed communication band. The method may involve determining whether at least one metric associated with a constraint on a transmissions channel of the unlicensed communication band indicates a traffic load on the unlicensed communication band. The method may involve sending a configuration message to the mobile entity for activation of a SCC in response to determining the at least one metric indicates a relatively high traffic load.

In further related aspects, the method may involve receiving the at least one metric from the mobile entity for determining whether the at least one metric is below the threshold indicative of the traffic load on the unlicensed communication band.

In yet further related aspects, the method may involve inferring a value of the at least one metric based on a data transmission queue size, traffic type, or quality of service (QoS) indication.

In yet further related aspects, the method may involve sending another configuration message to the mobile entity for deactivation of a second component carrier in response to determining the at least one metric does not indicate a relatively high traffic load.

In yet further related aspects, the method may involve determining whether at least one metric associated with a threshold indicative of a traffic load on the licensed communication band indicates a traffic load on the unlicensed communication band, where the at least one metric includes at least one of a cell loading, number of users on the unlicensed communication band, available backhaul bandwidth, or interference from access points configured for operation.

DETAILED DESCRIPTION

Figure 1:
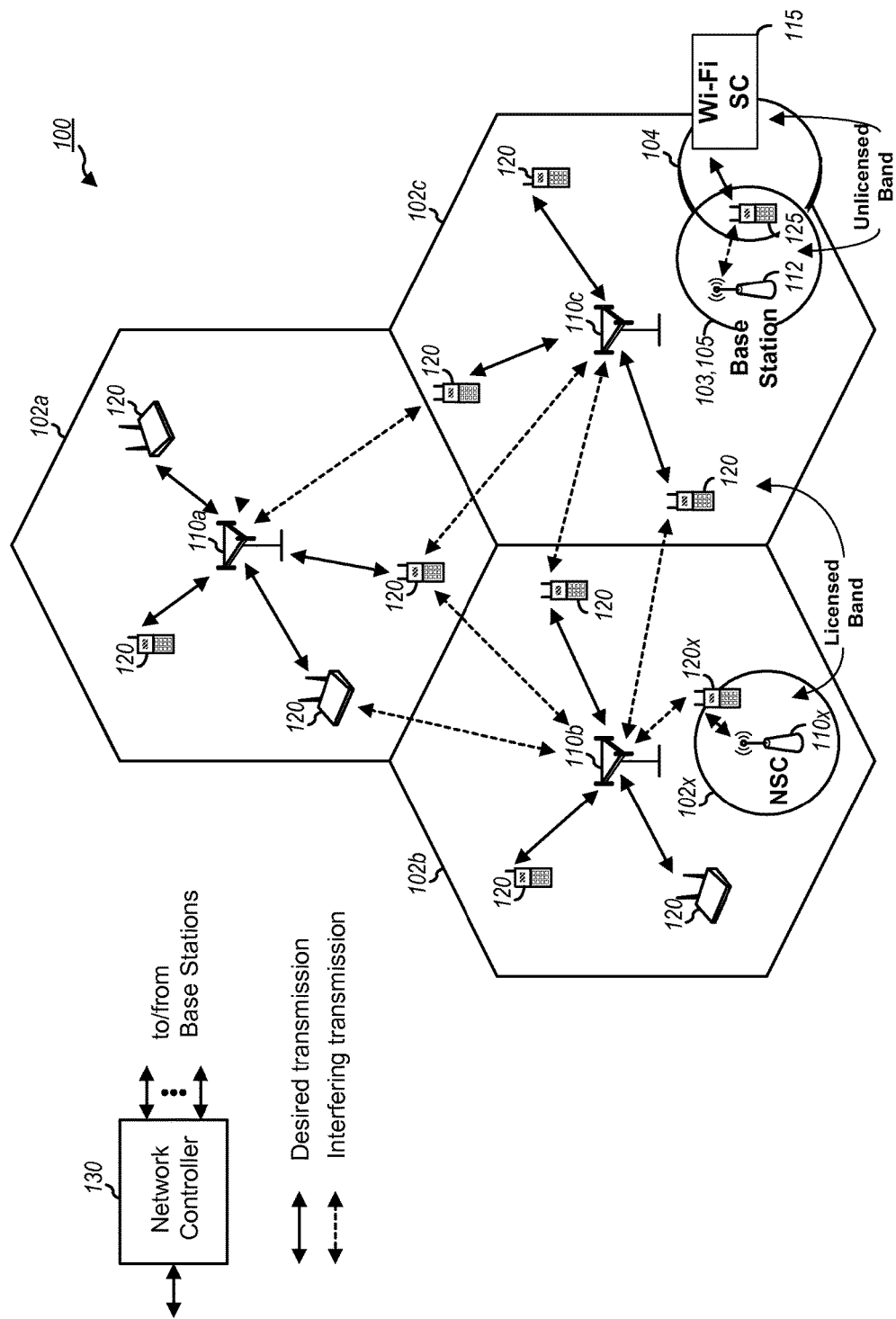
FIG. 1 is a block diagram conceptually illustrating an example of a telecommunications system.

The present disclosure relates to techniques for efficient LTE operation in the unlicensed band. For example, efficient LTE operation may include switching on and off secondary component carriers (SCCs) in the unlicensed communication band. A neighborhood small cell (NSC) may provide an alternative to deploying macro base stations to provide increased cellular coverage. However, a major roadblock for wide NSC deployment is the lack of available spectrum on licensed bands. Deploying NSCs on unlicensed bands holds great potential for increasing cellular coverage. It is noted that certain cellular protocols, such as LTE, provides higher spectral efficiency and coverage compared to non-cellular or WLAN protocols, such as Wi-Fi. However, the deployment of NSCs in the unlicensed bands may disrupt or cause interference to non-cellular (e.g., Wi-Fi) communications on the unlicensed bands.

In one example, there is provided a network entity (e.g., a small base station) that may establish a connection with a mobile device and send a message for switching on or off an SCC on the unlicensed communication band based on one or more metrics. The mobile devices may receive the message and switch on or off the SCC.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

FIG. 1 shows an example wireless communication network 100, which may be an LTE network or the like. The wireless network 100 may include a number of base stations 110 (e.g., evolved Node Bs (eNBs), NSCs, etc.) and other network entities. A base station may be a station that communicates with the UEs and may also be referred to as a Node B, an AP, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell or small cell (e.g., a pico cell, a femto cell, and/or other type of small cell). A macro cell may cover a relatively large geographic area (e.g., several kilometers in radius) and may allow unrestricted access by UEs with service subscription. Some types of small cells, for example, pico cells, may cover relatively small geographic areas and may allow unrestricted access by UEs with service subscriptions. Another type of small cell, for example, femto cells may cover relatively small geographic areas (e.g., a home) and may allow restricted access by UEs having association with the femto cell (e.g., UEs in a closed subscriber group (CSG), UEs for users in the home, etc.). It is noted that a pico cell and a femto cell are examples of NSCs. An NSC is an example of a small cell. As used herein, a small cell means a cell characterized by having a transmit power substantially less than each macro cell in the network with the small cell, such cell including, for example, low-power access nodes such as defined in 3GPP Technical Report (T.R.) 36.932 V12.1.0, Section 4 ("Introduction").

An eNB for a macro cell may be referred to as a macro eNB. An eNB for a small cell may be referred to as a small cell eNB. An eNB for a NSC may be referred to as a NSC eNB or a home eNB (HNB). In the example shown in FIG. 1, the eNBs 110a, 110b and 110c may be macro eNBs for the macro cells 102a, 102b and 102c, respectively.

The eNB 110x may be a NSC eNB for a NSC 102x, serving a UE 120x. In the present example, eNB 110x operates in licensed bands, as do the eNBs 110a, 110b and 110c. In contrast, a base station 112 operates in an unlicensed band, and includes both a NSC eNB module for a NSC 103 and a WLAN AP module to provide Wi-Fi coverage in a service area 105. The dual-capability base station 112 may serve a UE 125 that is configured to operate in the unlicensed band, either via the NSC 103 or via Wi-Fi, assuming the UE 125 is within the coverage area 105 and configured for Wi-Fi (i.e., includes a Wi-Fi radio module).

Figure 2:
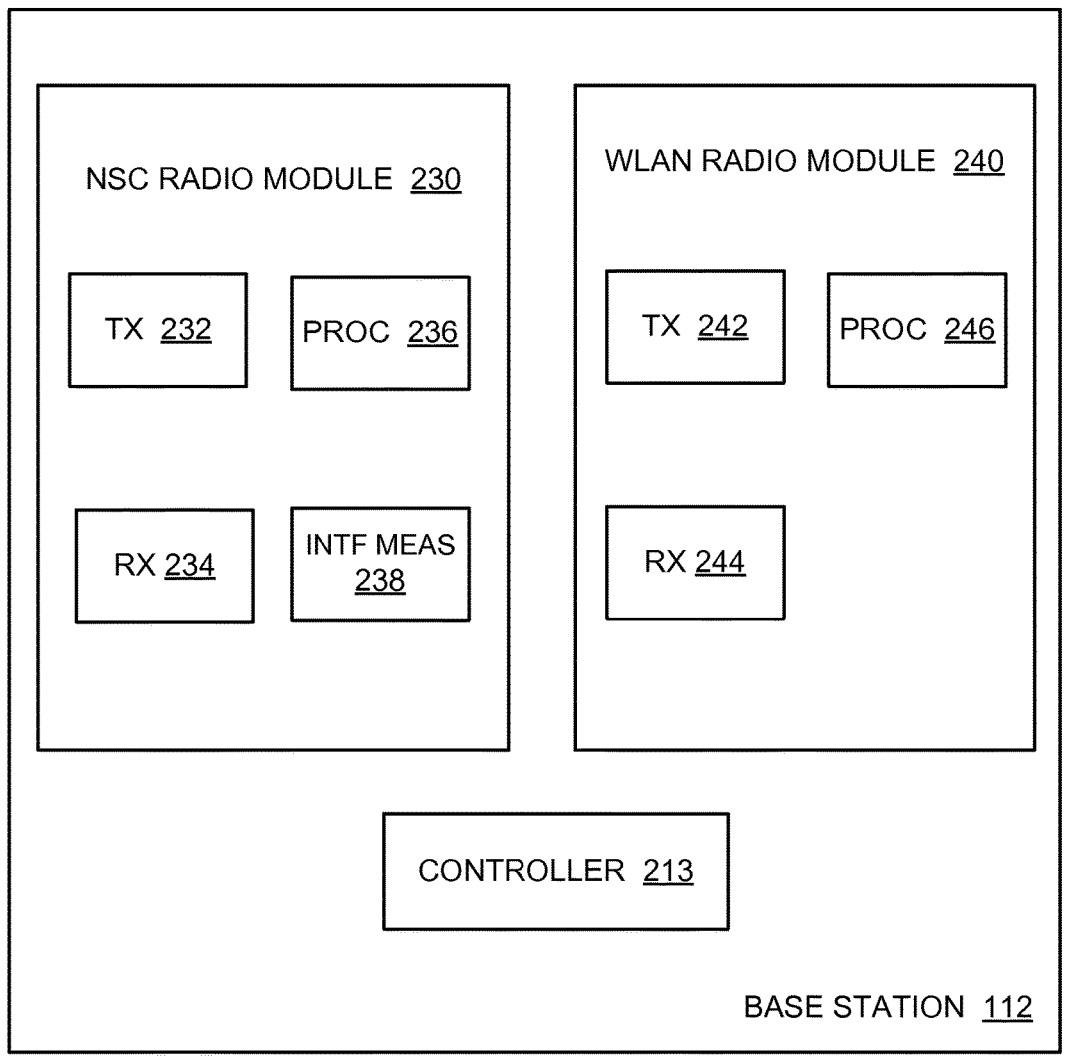
FIG. 2 shows an example dual-capacity base station.

An example dual-capability base station 112 is shown in FIG. 2. For example, a NSC radio module 230 and a WLAN radio module 240 may be co-located.

The base station 112 may optionally include a controller module 213 in operative communication with the NSC radio module 230 and the WLAN radio module 240 to coordinate the activity of the modules 230, 240 and/or components thereof.

In related aspects, the NSC radio module 230 may include a transmitter (TX) component 232, a receiver (RX) component 234, a processor component 236, and an channel load determination component 238, wherein each of the components are in operative communication with each other. The channel load determination component 238 may determine or coordinate the determination of a metric for deciding whether to activate/switch on or switch off a SCC.

The NSC radio module 230 may include one or more of the components of base station 112 shown on the left hand side of FIG. 2. The WLAN radio module 240 may include a TX component 242, a RX component 244, and a processor component 246, wherein each of the components are in operative communication with each other. In further related aspects, one or more of the components 232-238 may be configured to receive a metric from mobile devices for determining whether the metric indicates a high or low traffic load on the unlicensed band. For example, one or more of the components may compare a metric to a threshold value. In yet further related aspects, one or more of the components 232-238 may be configured to infer a value of the metric based on a data transmission queue size, traffic type, or quality of service (QoS) indication. In yet further related aspects, one or more of the components 232-238 may be configured to send a configuration message to the mobile device for deactivation of a SCC in response to determining the at least one metric does not indicate a relatively high traffic load, for example, if the metric is not below the threshold, or is not above the threshold. In yet further related aspects, one or more of the components 232-238 may be configured to receive the at least one metric from the mobile device for determining whether the metric is below the threshold indicative of the traffic load on the unlicensed communication band. In yet further related aspects, one or more of the components 232-238 may be configured to infer a value of the metric based on a data transmission queue size, traffic type, or QoS indication. In yet further related aspects, one or more of the components 232-238 may be configured to send another configuration message to the mobile entity for deactivation of a second component carrier in response to determining the at least one metric does not indicate a relatively high traffic load. For example, the at least one metric may be compared to a threshold indicative of a traffic load on the licensed communication band, and the at least one metric may include at least one of a cell loading, number of users on the unlicensed communication band, available backhaul bandwidth, or interference from access points configured for operation.

The base station 112 may initially operate as the WLAN AP and determine channel load from initiation available at the base station or from mobile devices communicating on channels of the unlicensed band. The base station 112 may then operate as the NSC and use the information to determine whether to activate/switch on or off SCCs in the unlicensed communication band.

With reference once again to FIG. 1, the network 100 may also include a WLAN AP, such as a Wi-Fi service center (SC) 115 or the like. The Wi-Fi SC 115 may operate in the unlicensed band providing Wi-Fi coverage in a service area 104. The Wi-Fi SC 115 may provide Wi-Fi service for a UE 125 that is within the coverage area 104 and configured for Wi-Fi (i.e., includes a Wi-Fi radio module). The UE 125 may be in the NSC 103 and the coverage area 104 simultaneously, and therefore may be capable of both cellular and non-cellular communication in the unlicensed band.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, or other mobile devices. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

Figure 3:
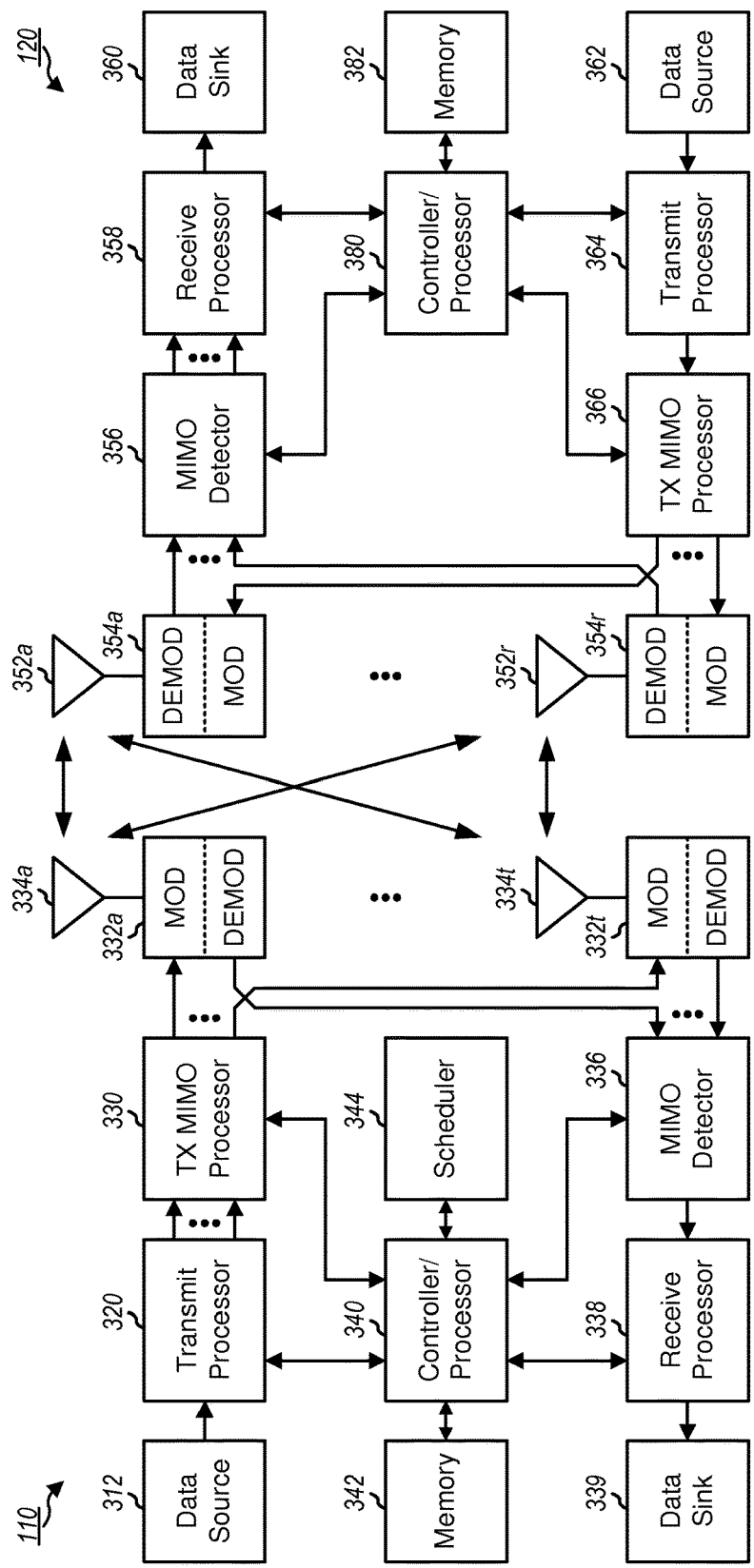
FIG. 3 is a block diagram illustrating a design of a base station/eNB and a UE configured according to one aspect of the present disclosure.

FIG. 3 shows a block diagram of a design of a base station 110 and a UE 120, which may be one of the base stations (e.g., an NSC such as 110x, 110y, or 110z) and one of the UEs, respectively, in FIG. 1. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DE- MODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of the functional blocks illustrated in FIG. 7, and/or other processes for the techniques described herein. The processor 380 and/or other processors and modules at the UE 120 may also perform or direct the execution of the functional blocks illustrated in FIG. 6, and/or other processes for the techniques described herein. The memories 342 and 382 may store data and program codes for the base station 110 and the UE 120, respectively. A scheduler 344 may schedule UEs for data transmission on the downlink and/or uplink.

As will be readily appreciated, antennas 352, modulators 354, transmit processor 364, and/or TX MIMO processor 366 may form a transmit chain of UE 120 and supply means for sending or transmitting uplink signals under the control of processor 380. For example, the transmit chain may supply means for establishing a connection with a component carrier (e.g., a primary component carrier) of an access point (e.g., an eNB). The transmit chain may supply means sending at least one metric to the access point.

As will be readily appreciated, antennas 352, demodulators 354, receive processor 358, and/or RX MIMO detector 356 may form a receive chain of UE 120 and supply means for establishing the connection with a component carrier (e.g., a primary component carrier) of an access point (e.g., an eNB).

In one aspect, processor 380 includes modules for performing operations of the methods described herein, by executing instructions held in the memory 382. The processor 380 may include means for determining whether the licensed communication band is available, and controlling the transmit chain and/or receive chain to establish the connection on the licensed communication band if the licensed communication band is available. The processor 380 may include means for selecting a known frequency band if the licensed communication band is not available. The processor 380 may include means for selecting one frequency band from a set of available frequency bands if the licensed communication band is not available.

The processor 380 may include means for determining at least one metric associated with a constraint on a transmissions channel of the unlicensed communication band. Such modules, for example, may be utilized by processor 380 to control operation of the respective transmit and receive chains.

Figure 4A:
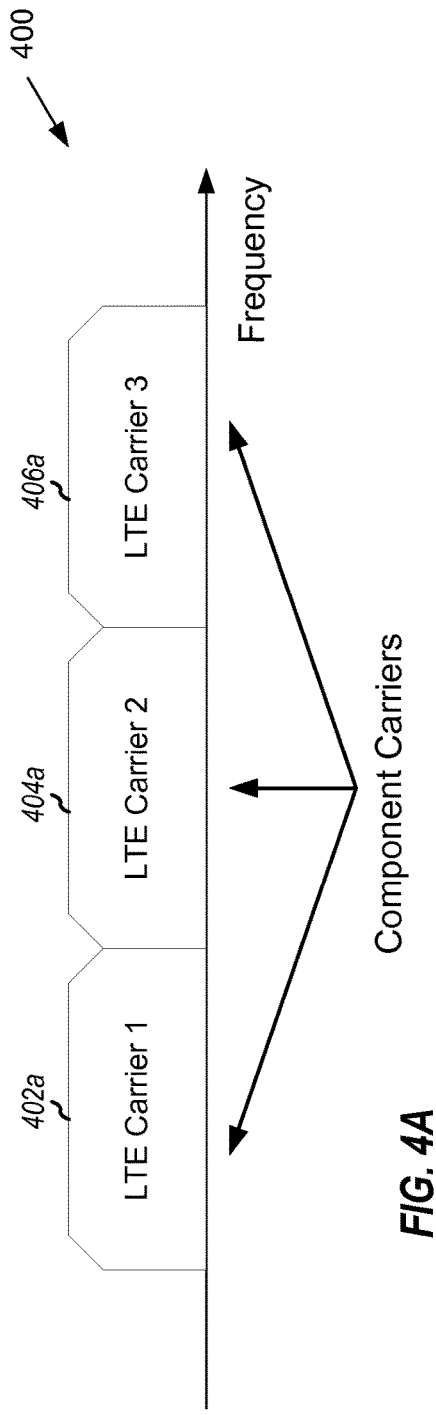
FIG. 4A discloses a contiguous carrier aggregation type.
Figure 4B:
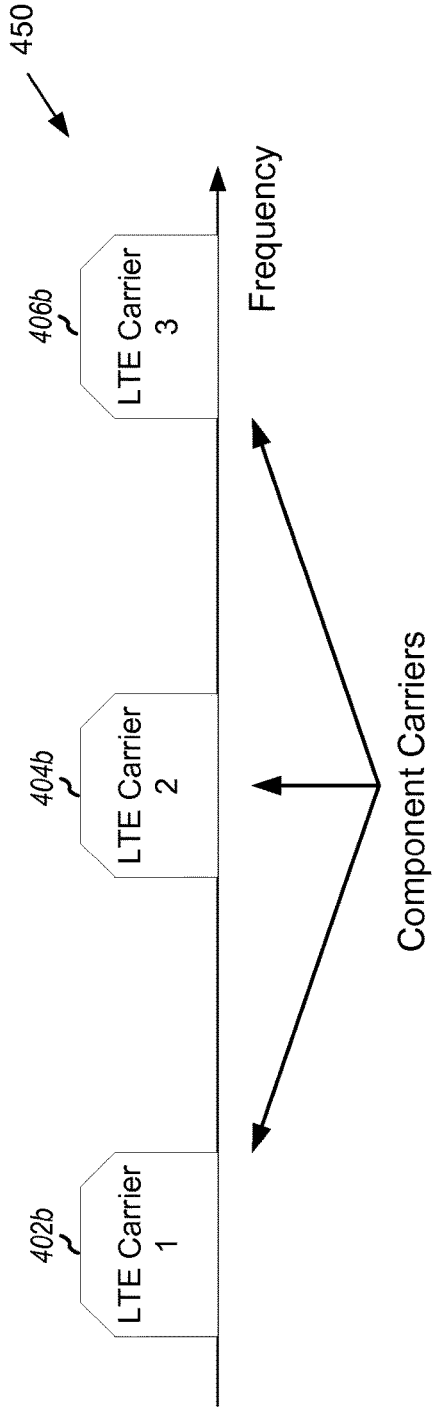
FIG. 4B discloses a non-contiguous carrier aggregation type.

FIG. 4A shows an example of contiguous carrier aggregation. K CCs may be available and may be adjacent to each other, where in general K may be any integer value. K may be limited to 5 or less in some LTE Releases. Each CC may have a bandwidth of up to 20 MHz. The overall system bandwidth may be up to 100 MHz when five CCs are supported. FIG. 4B shows an example of non-contiguous carrier aggregation. K CCs may be available and may be separate from each other. Each CC may have a bandwidth of up to 20 MHz. The aggregated carriers may include a primary component carrier (PCC), serving the primary serving cell (PSC or PCell). The primary serving cell may be referred to as the PCell. The aggregated carriers may include a number of SCCs, each serving a respective secondary serving cell (SSC or SCell).

In accordance with one or more aspects of the disclosure, there are provided methods and apparatuses for operating LTE devices in the unlicensed band. For example, the operations may include methods for efficient carrier aggregation operation in the unlicensed band.

One challenge for wide deployment of NSCs may be limited spectrum availability for wireless communication. NSC may be beneficial, but the lack of dedicated spectrum may present challenges for operators of mobile networks. For example, the 3.5 gigahertz (GHz) band may have only 100 megahertz (MHz) total, and this frequency band may or may not be licensed. Also, the co-channel operation of NSC with the macro layer may require interoperability with macro incumbent vendors.

Deploying NSC on the unlicensed spectrum (e.g., 5 GHz) may unleash potential benefits. For example, there may be vast unlicensed spectrum availability (e.g., in the 5 GHz band). LTE may provide higher spectral efficiency and coverage compared to Wi-Fi. In some cases, changes may be needed for operating LTE devices the unlicensed bands. In other cases, such as in the PHY layer and MAC layer there may be few or no changes needed. For example, LTE Rel 8 to Rel 11 may be used. Femtocell station modem (FSM) and mobile station modem (MSM) baseband with radio frequency integrated circuits (RFIC) interface may be changed for operations in the unlicensed bands.

Using LTE, e.g., in the unlicensed band, may provide advantages over Wi-Fi. For example, the advantages may include improved coverage, capacity, and mobility and quality of service (QoS).

With respect to coverage, LTE may support larger transmission signal delay spreads. LTE may operate at a lower signal to interference plus noise ratio (SINR) and PHY layer rates. LTE may provide OFDMA and frequency selective scheduling.

With respect to capacity, LTE may provide high spatial reuse gains with cell splitting compared to carrier sense multiple access (CSMA). Hybrid automatic repeat request (HARQ) in LTE may provide robustness in an environment with bursty interference. LTE may provide tight interference management with ICIC and uplink (UL) power control. A rich pilot structure enables efficient channel estimation and interference nulling. There may be higher flexibility and interference diversity with carrier aggregation.

With respect to mobility and QoS, self-organizing network techniques may provide excellent mobility and QoS for hyper dense unplanned network deployments.

Operating LTE devices in the unlicensed band may present certain challenges. For example, there may be asynchronous and uncoordinated interference from other devices (e.g., Wi-Fi devices, cordless phones, microwave ovens, etc.) operating in the unlicensed bands. There may be inter-LTE operator interference from co-channel and adjacent channel LTE deployments. In one aspect, different LTE operators may coordinate through synchronized TDD patterns, FDM, or enhanced inter-cell interference coordination (eICIC) on a SCC or other methods developed for inter-operator coexistence.

One challenge may be performance issues due to constraints introduced by WLAN RFIC.

In accordance with aspects of the disclosure, there are provided methods and techniques for efficient operation of carrier aggregation in the unlicensed band. A method for optimizing LTE operation in the unlicensed spectrum includes switching the SCCs on or off in the unlicensed bands based on one or more metrics. The metrics may signal availability or congestion of the unlicensed bands. For example, when the unlicensed bands are clear and available (such as when few other devices are using these bands) then an access point (e.g., eNB) may switch one or more SCCs on in the unlicensed bands for communication with the UE. For example, when the unlicensed bands are congested, the access point may switch one or more SCCs off in the unlicensed bands.

In one example, carrier aggregation including a PCC and a number of SCCs may be used. The PCC may be on the licensed band or may be on the unlicensed band. The SCC may be on the licensed band or may be on the unlicensed band; the SCCs may be on any combination of the licensed and unlicensed bands. When a licensed channel is available, the PCC may be on the licensed channel. If the licensed channel is not available, the PCC may be on the unlicensed band, e.g., on a known channel in the unlicensed band. In one aspect, the PCC may be on a predetermined (e.g., fixed) channel number or the PCC may be one a channel in a predetermined list of channels. The predetermined channel or list of channels may be known at the UE, e.g., by pre-configuration or by receiving information, from the network, including the predetermined channel or list of channels. In another aspect, the PCC may be selected based on the best coverage (e.g., based on emission limits and a center frequency). It may be preferable to select the PCC that is not a dynamic frequency selection (DFS) channel (e.g., an upper unlicensed national information infrastructure (U-NII) band).

Opportunistic carrier aggregation may be performed based on triggers. The PCell may switch on or off a SCell based on at least one trigger. For example, the triggers may be based on a metric such as a cell loading, number of users, backhaul bandwidth, or interference from Wi-Fi or other LTE operators. For example, when one SCell is heavily loaded, that SCell may be switched on. The triggers be based on a metric such as interference from nearby Wi-Fi Basic Serving Set (BSS) (e.g., measuring Wi-Fi packet strength). Hysteresis may be used when switching a SCell on or off. For example, the trigger may be based on two thresholds (e.g., a low threshold and a high threshold). For example, a SCell may be switched on when a metric associated with a trigger exceeds the high threshold, and may not be switched off until the metric is below the low threshold. In an example for backhaul bandwidth used as the trigger, two thresholds representing two bandwidth values may be used for the hysteresis. For example, when the bandwidth usage by the primary cell or other nodes using the back haul is above the high threshold, one or more SCells may be deactivated. One or more SCells may not be activated again until the bandwidth usage falls below the low threshold.

Figure 5:
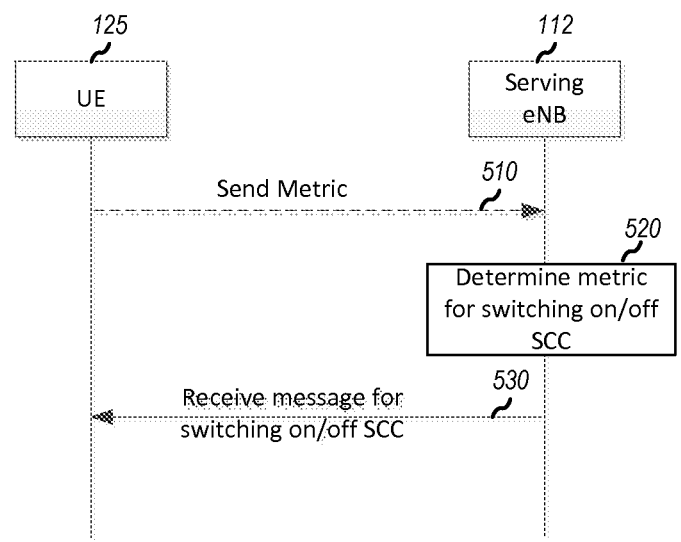
FIG. 5 illustrates an example call flow diagram for signaling switching one or off a secondary component carrier (SCC) in the unlicensed band.

FIG. 5 shows an example call flow diagram for signaling switching one or off a SCC in the unlicensed band. The PCC, e.g., at the serving eNB, may determine at least one metric to decide whether to switch a SCC on or off. The metric may be received from UE 125. The metric may be determined at the eNB 112 based on information available at the eNB 112. For example, at optional step 510, the UE 125 may send at least one metric to the eNB 112. The metric may relate to interference from other Wi-Fi devices or other LTE devices. For example, the metric may be information related to measurement reports. At step 520, the eNB 112 may determine whether to switch on or off a SCC based on the metric information received from the UE 125 and/or based on information available at the eNB 112. For example, the metric may be related to cell loading, number of users, backhaul bandwidth, or interference from Wi-Fi or other LTE operators. At step 530, the eNB 112 may send an indication to the UE 125 to switch on or off a SCC based on the determination at the eNB 520.

LTE small cells may be concentrated in part of the band which may carry the PCC and may opportunistically switch on/off SCells. This behavior may achieve opportunistic new carrier type (NCT) LTE behavior and reduce interference to Wi-Fi. Smart Wi-Fi may leave a PCC channel and move to other channels, which may make the PCC less susceptible to Wi-Fi interference which may improve robustness.

In one example, connection setup may be performed on the PCC, which may reduce the cell search space for the UEs. For example, the PCC may be on a subset of channels that may be searched (for the PCC) rather than a larger number of channels (e.g., 20+). Mobility may be easier because LTE small cells may use the same channel for the PCC. For example, mobility in connected and idle mode may be on the PCC, and idle users may camp on the PCC.

One challenge associated with LTE small cells may involve an LTE small cell desiring to switch to a different channel due to DFS or channel selection triggers, then the small cell may need to inform the UEs to hand over to the new channel. The channel selection and switching may require additional methods and mechanisms because existing procedures may not exist. Further, there may not be a guarantee that UEs may move to a new channel and find the small cell.

The disclosed methods and mechanisms may solve the problem above associated with channel selection and switching because channel switching may be controlled by the PCC through deactivating the old channel and activating the new channel. Using multiple SCCs may provide interference diversity, and UEs suffering from interference on one SCC may be served on other SCCs.

Selection of the SCCs may be based on a SCC pool. For example, when performing SCC channel selection, higher weights may be given to a certain pool of channels to keep LTE small cells concentrated on a few channels and to reduce interference to Wi-Fi. For example, the channel quality may be biased toward the channels belonging to the pool. In one case, the bias may be set to infinity to avoid any channel selection of channels outside of the pool. The selection of channels may be static or dynamic.

Figure 6:
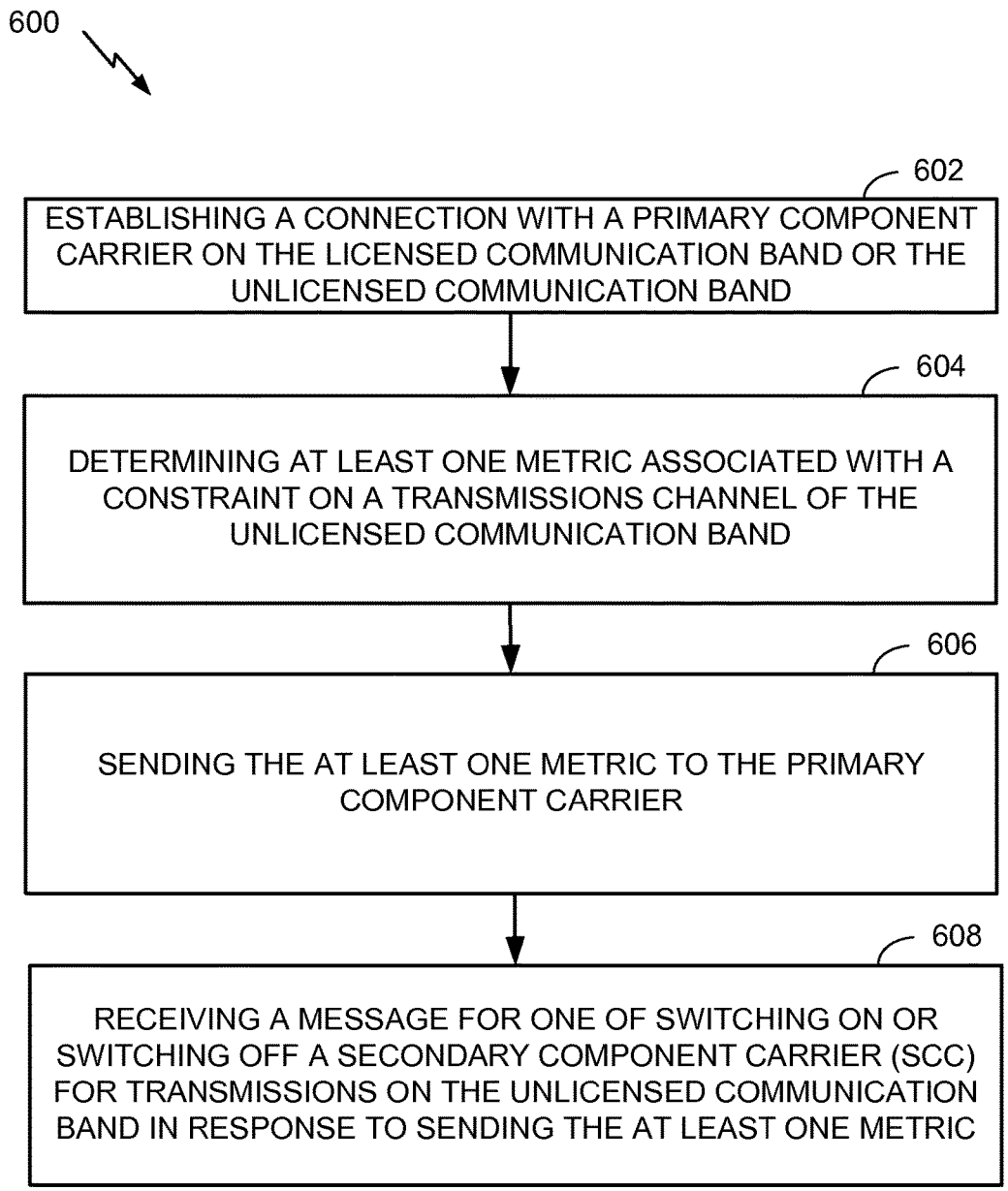
FIG. 6 illustrates aspects of a methodology for signaling switching one or off a SCC in the unlicensed band.

With reference to FIG. 6, there is shown a methodology 600, operable by a mobile device, wireless entity, user equipment, wireless device, wireless terminal, or the like. The mobile device may be UE 120 of FIG. 3 or UE 125 of FIG. 1. The mobile device may be configured and enabled for operation in the licensed communication band and/or the unlicensed communication band. Specifically, method 600 may describe methods associated with switching on or off SCCs on the unlicensed band. The method 600 may include, at 602, establishing a connection with a primary component carrier on the licensed communication band or the unlicensed communication band. The method 600 may include, at 604, determining at least one metric associated with a constraint on a transmissions channel of the unlicensed communication band. The method 600 may include, at 606, sending the at least one metric to the primary component carrier. The method 600 may include, at 608, receiving a message for one of switching on or switching off a SCC for transmissions on the unlicensed communication band in response to sending the at least one metric.

Figure 7:
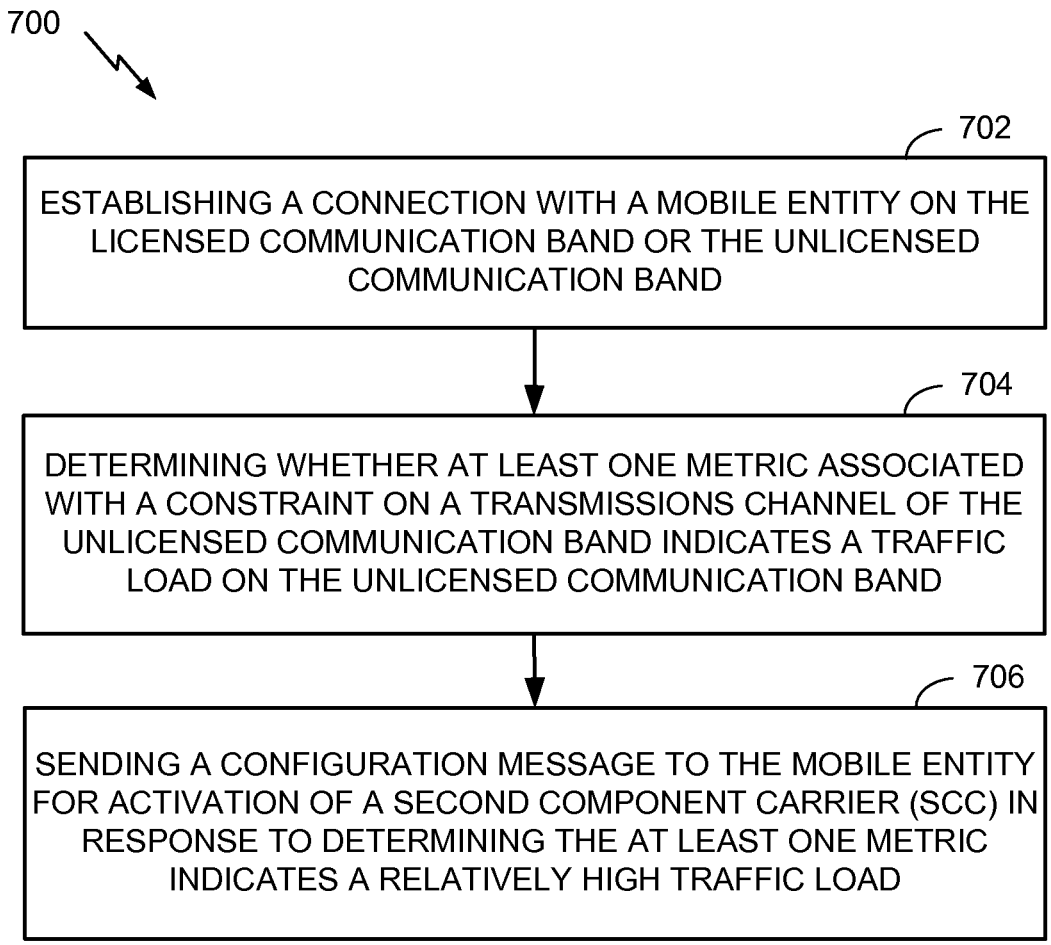
FIG. 7 illustrates aspects of another methodology for signaling switching one or off a SCC in the unlicensed band.

With reference to FIG. 7, there is shown a methodology 700, operable by an access point, access node, eNB, network node, or the like. The access point may be eNB 110 of FIG. 3 or eNB 112 of FIG. 2. The access point may be configured and enabled for operation in the licensed communication band and/or the unlicensed communication band. Specifically, method 700 may describe managing a power setting of the mobile device. The method 700 may include, at 702, establishing a connection with a mobile entity on the licensed communication band or the unlicensed communication band. The method 700 may include, at 704, determining whether at least one metric associated with a constraint on a transmissions channel of the unlicensed communication band indicates a traffic load on the unlicensed communication band. For example, a metric exceeding a threshold may indicate a relatively high traffic load. The method 700 may include, at 706, sending a configuration message to the mobile entity for activation of a SCC in response to determining the at least one metric indicates a relatively high traffic load. A relatively high traffic load may include, for example, a traffic load that is higher than normal, or high enough to cause users to notice bandwidth constraints.

Figure 8:
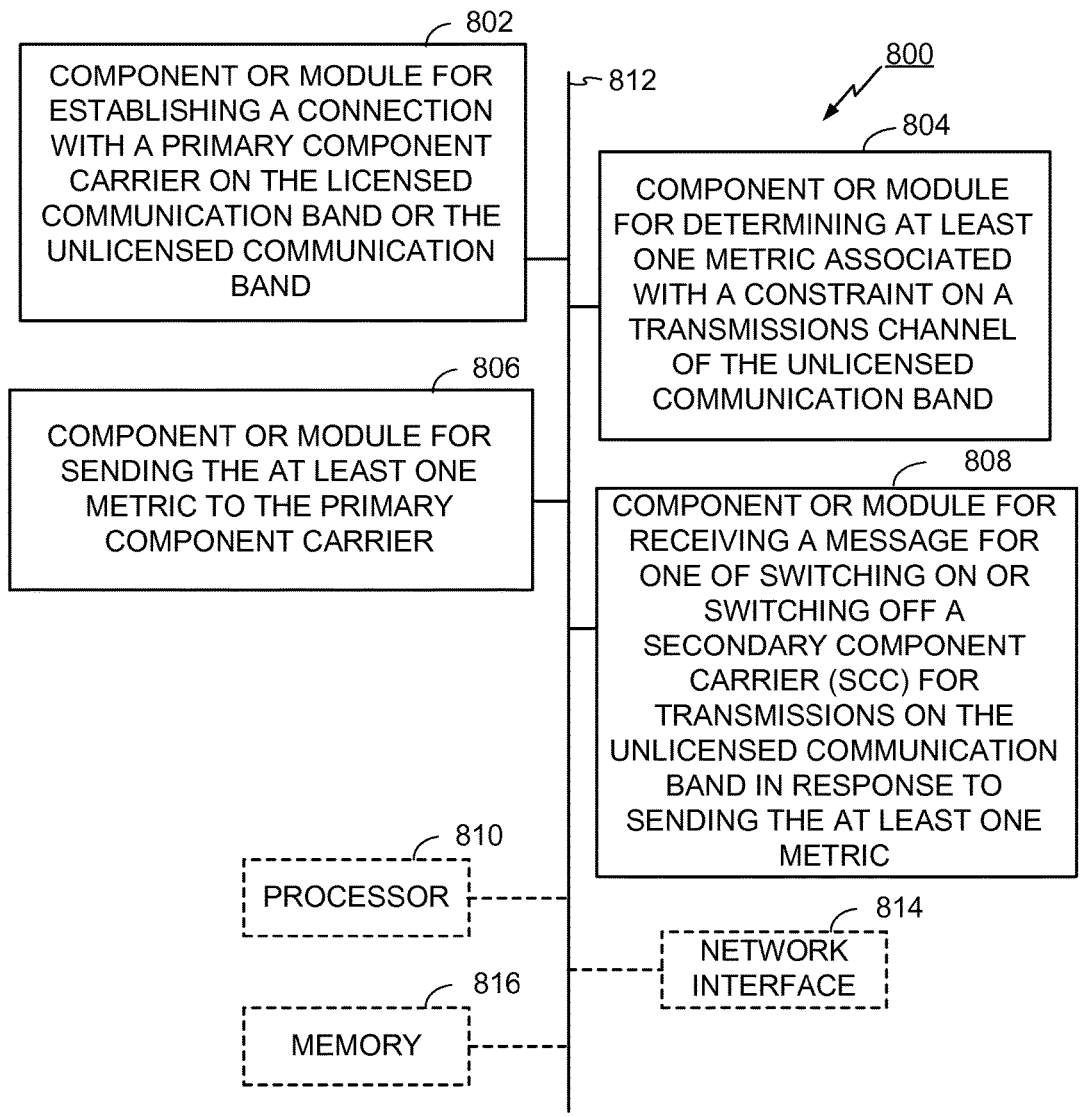
FIG. 8 is an example embodiment for a mobile device for signaling switching one or off a SCC in the unlicensed band.

With reference to FIG. 8, there is provided an exemplary apparatus 800 that may be configured as a UE, mobile device, or other suitable entity, or as a processor, component or similar device for use within the UE, or other suitable entity. The apparatus 800 may include functional blocks that can represent functions implemented by a processor, software, or combination thereof (e.g., firmware).

As illustrated, in one embodiment, the apparatus 800 may include an electrical component or module 802 for establishing a connection with a primary component carrier on the licensed communication band or the unlicensed communication band. The component or module 802 may be, or may include, a means for establishing a connection with a primary component carrier on the licensed communication band or the unlicensed communication band. Said means may be, or may include, a processor connected to a transceiver executing an algorithm from a computer memory. An algorithm may include, for example, receiving a signal indicating one of the licensed communication band or the unlicensed communication band, and transmitting a signal on a selected band in response to the receiving.

The apparatus 800 may include an electrical component or module 804 for determining at least one metric associated with a constraint on a transmissions channel of the unlicensed communication band. The component or module 804 may be, or may include, a means for determining at least one metric associated with a constraint on a transmissions channel of the unlicensed communication band. Said means may be, or may include, a processor executing an algorithm from a computer memory. An algorithm may include, for example, identifying a transmissions channel of an unlicensed communication band associated with a connection, and obtaining at least one metric of a constraint on the transmission channel by one or more of retrieving from a memory or requesting from another node of a communications network.

The apparatus 800 may include an electrical component or module 806 for sending the at least one metric to the primary component carrier. The component or module 806 may be, or may include, a means for sending the at least one metric to the primary component carrier. Said means may be, or may include, a processor connected to a transceiver or network port executing an algorithm from a computer memory. An algorithm may include, for example, encoding the at least one metric, and transmitting the at least one metric over a wired or wireless connection.

The apparatus 800 may include an electrical component or module 808 for receiving a message for one of switching on or switching off a SCC for transmissions on the unlicensed communication band in response to sending the at least one metric. The component or module 808 may be, or may include, a means for receiving a message for one of switching on or switching off a SCC for transmissions on the unlicensed communication band in response to sending the at least one metric. Said means may be, or may include, a processor connected to a transceiver or network port executing an algorithm from a computer memory. An algorithm may include, for example, receiving a signal, decoding the signal, and determining that the decoded signal is responsive to the sending the at least one metric.

In related aspects, the apparatus 800 may optionally include a processor component 810 having at least one processor, in the case of the apparatus 800 configured as a network entity. The processor 810, in such case, may be in operative communication with the components 802-808 or similar components via a bus 812 or similar communication coupling. The processor 810 may effect initiation and scheduling of the processes or functions performed by electrical components or modules 802-808.

In further related aspects, the apparatus 800 may include a network interface component 814 for communicating with other network entities. The apparatus 800 may optionally include a component for storing information, such as, for example, a memory device/component 816. The computer readable medium or the memory component 816 may be operatively coupled to the other components of the apparatus 800 via the bus 812 or the like. The memory component 816 may be adapted to store computer readable instructions and data for performing the activity of the components 802-808, and subcomponents thereof, or the processor 810. The memory component 816 may retain instructions for executing functions associated with the components 802-808. While shown as being external to the memory 816, it is to be understood that the components 802-808 can exist within the memory 816.

Figure 9:
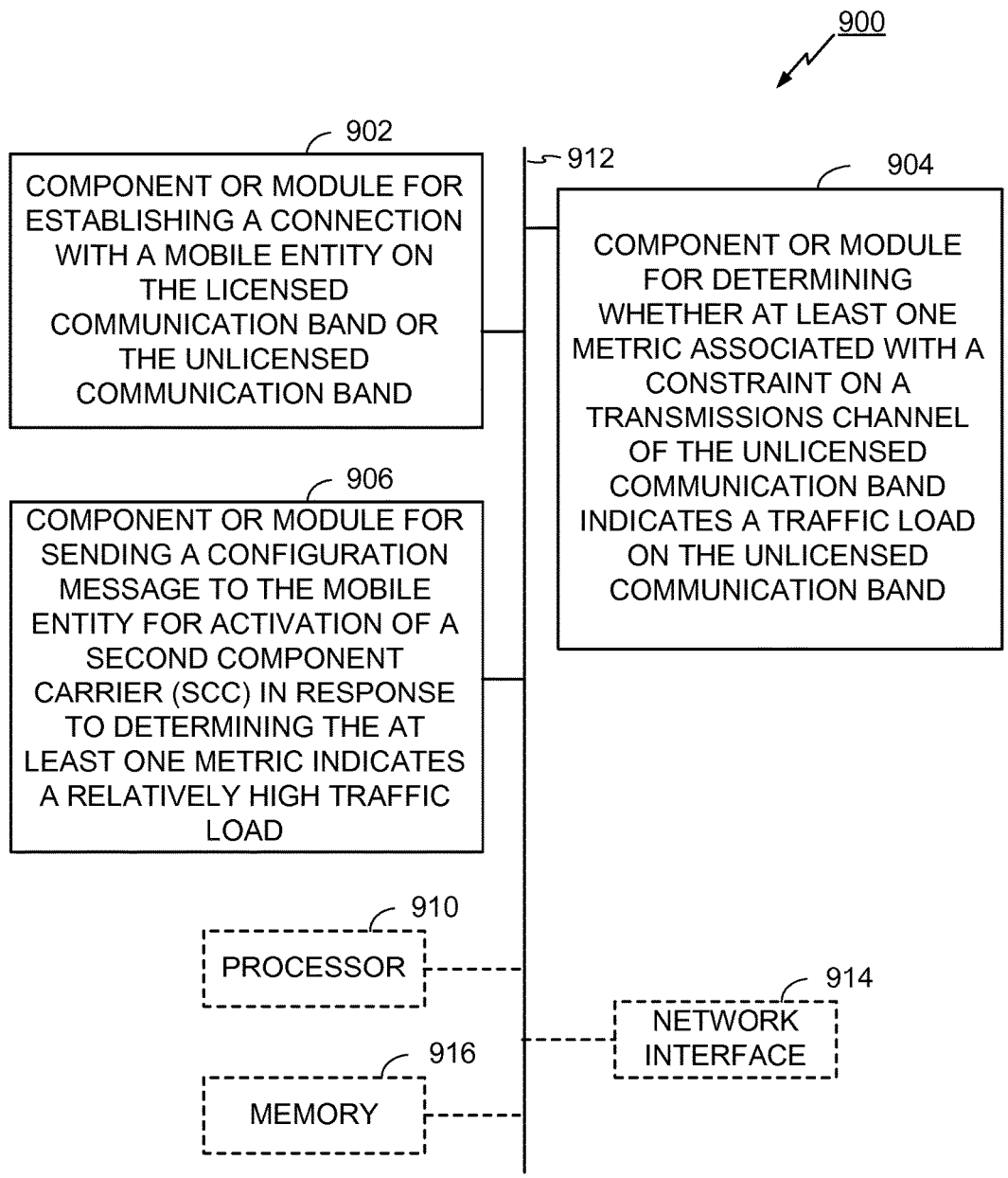
FIG. 9 is an example embodiment for an access point for signaling switching one or off a SCC in the unlicensed band.

With reference to FIG. 9, there is provided an exemplary apparatus 900 that may be configured as an access point, access node, eNB, network node, or other suitable entity, or as a processor, component or similar device for use within the eNB, or other suitable entity. The apparatus 900 may include functional blocks that can represent functions implemented by a processor, software, or combination thereof (e.g., firmware).

As illustrated, in one embodiment, the apparatus 900 may include an electrical component or module 902 for establishing a connection with a mobile entity on the licensed communication band or the unlicensed communication band. The component or module 902 may be, or may include, a means for establishing a connection with a mobile entity on the licensed communication band or the unlicensed communication band. Said means may be, or may include, a processor connected to a transceiver executing an algorithm from a computer memory. An algorithm may include, for example, determining at least one parameter indicating a current state of one or more communication channels, selecting one of the licensed communication band or the unlicensed communication band based on the at least one parameter, transmitting a signal on a selected band, and receiving a signal on the selected band.

The apparatus 900 may include an electrical component or module 904 for determining whether at least one metric associated with a constraint on a transmissions channel of the unlicensed communication band indicates a traffic load on the unlicensed communication band. The component or module 904 may be, or may include, a means for determining whether at least one metric associated with a constraint on a transmissions channel of the unlicensed communication band indicates a traffic load on the unlicensed communication band. Said means may be, or may include, a processor executing an algorithm from a computer memory. An algorithm may include, for example, determining a value of the at least one metric, comparing the value to a threshold value retrieved from a memory or from another node, and making a determination of whether the traffic load is one or more of high, low, or normal, based on the relative values of the threshold and the metric.

The apparatus 900 may include an electrical component or module 906 for sending a configuration message to the mobile entity for activation of a SCC in response to determining the at least one metric indicates a relatively high traffic load. The component or module 906 may be, or may include, a means for sending a configuration message to the mobile entity for activation of a SCC in response to determining the at least one metric indicates a relatively high traffic load. Said means may be, or may include, a processor connected to a transceiver executing an algorithm from a computer memory. An algorithm may include, for example, encoding a configuration message in response to determining that the at least one metric indicates a relatively high traffic load, and transmitting the configuration message.

In related aspects, the apparatus 900 may optionally include a processor component 910 having at least one processor, in the case of the apparatus 900 configured as a network entity. The processor 910, in such case, may be in operative communication with the components 902-906 or similar components via a bus 912 or similar communication coupling. The processor 910 may effect initiation and scheduling of the processes or functions performed by electrical components or modules 902-906.

In further related aspects, the apparatus 900 may include a network interface component 914 for communicating with other network entities. The apparatus 900 may optionally include a component for storing information, such as, for example, a memory device/component 916. The computer readable medium or the memory component 916 may be operatively coupled to the other components of the apparatus 900 via the bus 912 or the like. The memory component 916 may be adapted to store computer readable instructions and data for performing the activity of the components 902-906, and subcomponents thereof, or the processor 910. The memory component 916 may retain instructions for executing functions associated with the components 902-906. While shown as being external to the memory 916, it is to be understood that the components 902-906 can exist within the memory 916.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer-readable storage media and communication media including media that facilitates transfer of a computer program from one place to another. A computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), then the coaxial cable, fiber optic cable, twisted pair, or DSL, are included in the definition of computer-readable medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method operable by a user equipment (UE) configured for operation in a licensed communication band and an unlicensed communication band, comprising:
   establishing a connection with a primary component carrier (PCC);
   determining at least one metric associated with a constraint on a transmission channel of a secondary component carrier (SCC) in the unlicensed communication band, the determined at least one metric including a measure of interference from at least one access point;
   sending the determined at least one metric on the PCC; and
   receiving a message for switching on or switching off the SCC for transmissions on the unlicensed communication band in response to sending the determined at least one metric, wherein the SCC is selected from a set of unlicensed communication bands, the set being associated with a biasing parameter defining a likelihood of selection from the set.

2. The method of claim 1, wherein the determined at least one metric is associated with a threshold indicative of a traffic load on the unlicensed communication band, and wherein the determined at least one metric further comprises one or more of a cell loading, a traffic type, or a quality of service (QoS) indication, or an available backhaul bandwidth.

3. The method of claim 1, wherein the determined at least one metric is an available backhaul bandwidth; and
   wherein the message indicates switching on the SCC for transmissions on the unlicensed communication band when the usage of the available backhaul bandwidth by network nodes is below a threshold.

4. The method of claim 1, further comprising selecting a frequency band in the unlicensed communication band if the licensed communication band is not available.

5. The method of claim 1, further comprising selecting one frequency band from a set of available frequency bands if the licensed communication band is not available.

6. The method of claim 1, wherein the determined at least one metric includes a number of users on the unlicensed communication band; and
   wherein the message indicates switching the SCC off for transmissions on the unlicensed communication band when the number of users on the unlicensed communication band exceeds a threshold.

7. A user equipment (UE) for operation in a licensed communication band and an unlicensed communication band, comprising:
   means for establishing a connection with a primary component carrier (PCC);
   means for determining at least one metric associated with a constraint on a transmission channel of a secondary component carrier (SCC) in the unlicensed communication band, the determined at least one metric including a measure of interference from at least one access point; and
   means for sending the determined at least one metric on the PCC; and
   means for receiving a message for switching on or switching off the SCC for transmissions on the unlicensed communication band in response to sending the determined at least one metric, wherein the SCC is selected from a set of unlicensed communication bands, the set being associated with a biasing parameter defining a likelihood of selection from the set.

8. The UE of claim 7, wherein the determined at least one metric is associated with a threshold indicative of a traffic load on the unlicensed communication band, and wherein the determined at least one metric further comprises one or more of a cell loading, a traffic type, or a quality of service (QoS) indication, or an available backhaul bandwidth.

9. The UE of claim 7, wherein the determined at least one metric is an available backhaul bandwidth; and
   wherein the message indicates switching on the SCC for transmissions on the unlicensed communication band when the usage of the available backhaul bandwidth by network nodes is below a threshold.

10. The UE of claim 7, further comprising means for:
    selecting a frequency band in the unlicensed communication band if the licensed communication band is not available.

11. The UE of claim 7, further comprising means for:
    selecting one frequency band from a set of available frequency bands if the licensed communication band is not available.

12. A user equipment (UE) for operation in a licensed communication band and an unlicensed communication band, comprising:
    at least one processor configured for establishing a connection with a primary component carrier (PCC), and determining at least one metric associated with a constraint on a transmission channel of a secondary component carrier (SCC) in the unlicensed communication band, the determined at least one metric including a measure of interference from at least one access point;

at least one transceiver configured for sending the determined at least one metric on the PCC, and receiving a message for switching on or switching off the SCC for transmissions on the unlicensed communication band in response to sending the determined at least one metric, wherein the SCC is selected from a set of unlicensed communication bands, the set being associated with a biasing parameter defining a likelihood of selection from the set; and
a memory coupled to the at least one processor for storing data.

13. The UE of claim 12, wherein the determined at least one metric is associated with a threshold indicative of a traffic load on the unlicensed communication band, and wherein the determined at least one metric further comprises one or more of a cell loading, a traffic type, or a quality of service (QoS) indication, or an available backhaul bandwidth.

14. The UE of claim 13, wherein the determined at least one metric is an available backhaul bandwidth; and
wherein the message indicates switching on the SCC for transmissions on the unlicensed communication band when the usage of the available backhaul bandwidth by network nodes is below a threshold.

15. The UE of claim 12, wherein the at least one processor is further configured for selecting a frequency band in the unlicensed communication band if the licensed communication band is not available.

16. The UE of claim 12, wherein the at least one processor is further configured for selecting one frequency band from a set of available frequency bands if the licensed communication band is not available.

17. A non-transitory computer readable medium storing computer executable code for operation of a user equipment (UE) in a licensed communication band and an unlicensed communication band, comprising code to:
establish a connection with a primary component carrier (PCC) on the licensed communication band or the unlicensed communication band;
determine at least one metric associated with a constraint on a transmission channel of a secondary component carrier (SCC) in the unlicensed communication band, the determined at least one metric including a measure of interference from at least one access point;
send the determined at least one metric on the primary component carrier; and
receive a message for switching on or switching off the SCC for transmissions on the unlicensed communication band in response to sending the determined at least one metric, wherein the SCC is selected from a set of unlicensed communication bands, the set being associated with a biasing parameter defining a likelihood of selection from the set.

18. The non-transitory computer readable medium of claim 17, wherein the determined at least one metric is associated with a threshold indicative of a traffic load on the unlicensed communication band, and wherein the determined at least one metric further comprises one or more of a cell loading, a traffic type, or a quality of service (QoS) indication, or an available backhaul bandwidth.

19. The non-transitory computer readable medium of claim 17, wherein the determined at least one metric is an available backhaul bandwidth; and
wherein the message indicates switching on the SCC for transmissions on the unlicensed communication band when the usage of the available backhaul bandwidth by network nodes is below a threshold.

20. A method operable by a base station configured for operation in a licensed communication band and an unlicensed communication band, comprising:
establishing a connection, via a primary component carrier (PCC), with a mobile entity;
receiving, from said mobile entity, at least one metric associated with a constraint on a transmission channel of the unlicensed communication band, the at least one metric including a measure of interference from at least one access point; and
sending a configuration message to the mobile entity for activation or deactivation of a secondary component carrier (SCC) for transmissions on the unlicensed communication band in response to receiving the at least one metric, wherein the SCC is selected from a set of unlicensed communication bands, the set being associated with a biasing parameter defining a likelihood of selection from the set.

21. The method of claim 20, wherein the at least one metric received from the mobile entity is associated with a threshold indicative of a traffic load on the unlicensed communication band.

22. The method of claim 20, further comprising inferring a value of the at least one metric based on a data transmission queue size, a traffic type, or a quality of service (QoS) indication.

23. The method of claim 20, wherein the at least one metric is an available backhaul bandwidth; and
wherein the configuration message sent to the mobile entity is for deactivation of the SCC when the usage of the available backhaul bandwidth by network nodes is above a threshold.

24. The method of claim 20, wherein the at least one metric is associated with a threshold indicative of a traffic load on the licensed communication band, and wherein the at least one metric further comprises a cell loading.

25. The method of claim 20, wherein the at least one metric includes a number of users on the unlicensed communication band; and
wherein the configuration message sent to the mobile entity is for activation of the SCC for transmissions on the unlicensed communication band when the number of users on the unlicensed communication band is below a threshold.

26. A base station for operation in a licensed communication band and an unlicensed communication band, comprising:
means for establishing a connection, via a primary component carrier (PCC), with a mobile entity;
means for receiving, from said mobile entity, at least one metric associated with a constraint on a transmission channel of the unlicensed communication band, the at least one metric including a measure of interference from at least one access point; and
means for sending a configuration message to the mobile entity for activation or deactivation of a second component carrier (SCC) in response to receiving the at least one metric, wherein the SCC is selected from a set of unlicensed communication bands, the set being associated with a biasing parameter defining a likelihood of selection from the set.

27. The base station of claim 26, wherein the at least one metric received from the mobile entity is associated with a threshold indicative of a traffic load on the unlicensed communication band.

28. The base station of claim 26, further comprising means for:
  inferring a value of the at least one metric based on a data transmission queue size, traffic type, or quality of service (QoS) indication.

29. The base station of claim 26,
  wherein the at least one metric is an available backhaul bandwidth; and
  wherein the configuration message sent to the mobile entity is for deactivation of the SCC when the usage of the available backhaul bandwidth by network nodes is above a threshold.

30. A base station for operation in a licensed communication band and an unlicensed communication band, comprising:
  at least one processor configured for establishing a connection, via a primary component carrier (PCC), with a mobile entity;
  at least one transceiver configured for receiving at least one metric associated with a constraint on a transmission channel of the unlicensed communication band, the at least one metric including a measure of interference from at least one access point; and
  wherein the at least one transceiver is further configured for sending a configuration message to the mobile entity for activation or deactivation of a second component carrier (SCC) for transmissions on the unlicensed communication band in response to receiving the at least one metric, wherein the SCC is selected from a set of unlicensed communication bands, the set being associated with a biasing parameter defining a likelihood of selection from the set; and
  a memory coupled to the at least one processor for storing data.

31. The base station of claim 30, wherein the at least one metric received from the mobile entity is associated with a threshold for a traffic load on the unlicensed communication band.

32. The base station of claim 30, wherein the at least one processor is further configured for inferring a value of the at least one metric based on a data transmission queue size, traffic type, or quality of service (QoS) indication.

33. The base station of claim 30, wherein the at least one metric is an available backhaul bandwidth; and
  wherein the at least one transceiver is configured to send the configuration message to the mobile entity for deactivation of the SCC when usage of the available backhaul bandwidth by network nodes is above a threshold.

34. A non-transitory computer readable medium storing computer executable code for operation of a base station in a licensed communication band and an unlicensed communication band, comprising code to:
  establish a connection, via a primary component carrier (PCC), with a mobile entity;
  receive at least one metric associated with a constraint on a transmission channel of the unlicensed communication band, the at least one metric including a measure of interference from at least one access point; and
  send a configuration message to the mobile entity for activation or deactivation of a second component carrier (SCC) for transmissions on the unlicensed communication band in response to receiving the at least one metric, wherein the SCC is selected from a set of unlicensed communication bands, the set being associated with a biasing parameter defining a likelihood of selection from the set.

35. The non-transitory computer readable medium of claim 34, wherein the at least one metric received from the mobile entity is associated with a threshold indicative of a traffic load on the unlicensed communication band.

36. The non-transitory computer readable medium of claim 34, wherein the non-transitory computer readable medium further stores code to infer a value of the at least one metric based on a data transmission queue size, traffic type, or quality of service (QoS) indication.

37. The non-transitory computer readable medium of claim 34, wherein the at least one metric is an available backhaul bandwidth; and
  wherein the non-transitory computer readable medium further stores code to send the configuration message to the mobile entity for deactivation of the SCC when the usage of the available backhaul bandwidth by network nodes is above a threshold.

* * * * *